(12) United States Patent
Arcos

(10) Patent No.: US 6,465,900 B1
(45) Date of Patent: Oct. 15, 2002

(54) WIND-OPERATED GENERATOR

(76) Inventor: Manuel Fernández Arcos, Vallés 89-91 Atco. 3ª, Sant Cugat del Vallés, E-08190 (ES)

(*) Notice: Subject to any disclaimer, the term of this patent is extended or adjusted under 35 U.S.C. 154(b) by 0 days.

(21) Appl. No.: 09/763,485
(22) PCT Filed: Feb. 22, 2001
(86) PCT No.: PCT/ES00/00138
§ 371 (c)(1),
(2), (4) Date: Feb. 22, 2001
(87) PCT Pub. No.: WO00/79127
PCT Pub. Date: Dec. 28, 2000

(30) Foreign Application Priority Data

Jun. 22, 1999 (ES) .............................................. P9901380

(51) Int. Cl.⁷ .............................. F03D 9/20; F01D 1/36; F03B 13/12
(52) U.S. Cl. ............................ 290/55; 290/43; 290/44; 290/54
(58) Field of Search ............................ 240/43, 44, 53, 240/54, 55

(56) References Cited

U.S. PATENT DOCUMENTS

| 4,110,630 A | * | 8/1978 | Hendel | 290/53 |
| 4,292,540 A | * | 9/1981 | Thompson | 290/55 |
| 4,446,379 A | * | 5/1984 | Borg | 290/55 |

* cited by examiner

Primary Examiner—Tran Nguyen
Assistant Examiner—Iraj A Mohandesi
(74) Attorney, Agent, or Firm—Maria Parrish Tungol

(57) ABSTRACT

An aeolian generator, characterised because it includes a cylindrical vessel (1), a hollow body (2) which is housed in the vessel (1) and which can turn, as a sufficient amount of liquid is contained inside the vessel (1) to keep the hollow body (2) afloat, a cover (23) for the hollow body (2), a series of blades (4) joined to the cover of the hollow body (2), several electric generators (5), wheels (51) mounted on the axles of the electric generators and used to make contact with the body (2) while it turns, supports (61) equipped with rails (6) on which the generators (5) are mounted and can move, and a thrust device used to control the movement of the generators (5) on the rails (6), causing them to move towards the hollow body (2) when it is turning at a certain speed.

16 Claims, 2 Drawing Sheets

WIND-OPERATED GENERATOR

PURPOSE OF THE INVENTION

This invention refers to an aeolian generator, of the type used to generate electrical energy using the wind as the driving force. This generator Includes the use of a hollow, floating body, that turns by wind action on blades joined to It, and the transmission of the turn movement of this body to wheels joined to axles of several electricity generators.

BACKGROUND TO THE INVENTION

One of the existing technological challenges is to obtain electrical energy using non-contaminant methods and systems. The most widely known and used non-contaminant systems are the aeolian and hydraulic systems, in which the energy of a fluid in movement Is transformed to move the blades of a generator.

The use of hydraulic energy for this action, requires, in the majority of cases, a dam in a river or water current, so that water is accumulated until reaching a significant level, causing a turbine to turn as it falls from a certain height.

The construction of these dams has a significant impact on the environment, as in the majority of cases, the tail of the reservoir floods fertile valleys and villages.

The use of aeolian energy to activate generators requires towers or posts to be assembled in windy areas, which are used to support the generators with their corresponding blades. In order for these aeolian generators to be profitable, they need to be positioned strategically at high points, meaning that they are also very visible from an environmental point of view.

The lay-out of these generators on the aforementioned posts considerably hinders their assembly and accessibility for maintenance or repair works.

As a background to this invention, we should mention the Patent of invention 461.890 referring to a "Procedure to generate movement and energy from floating bodies", which contemplates the use of a vessel equipped with an inlet valve and a liquid elector valve. There is a body inside this vessel which is either hollow or filed with a low density material. By successively introducing and extracting liquid In the vessel, an alternate movement (upwards-downwards) movement of the floating body is achieved, which is used to obtain energy.

In this case, the floating body must continuously perform alternate vertical movements and requires the continuous intake of fluid and energy use in order to open and close the inlet and elector valves, which uses an important part of the generated energy.

DESCRIPTION OF THE INVENTION

The aeolian generator which is the object of this invention, consists of a cylindrical vessel in which a hollow, cylinder body is freely housed, The vessel has a closed base and an upper cover which holds the blades.

The diameter of the hollow body is slightly less than the inside diameter of the vessel, so that there is a cavity between them, in which a sufficient amount of liquid is hosed to float the hollow body, and to enable the hollow body to turn on a horizontal plane when wind blows on the blades which are fixed to it. These diameters are similar to the unit, and therefore the amount of water needed t keep the hollow body afloat is not very high. As this generator is activated by wind, additional energy is not required, and therefore practically all the energy produced can be used.

The floating state of the hollow body, means that it can easily turn in the wind.

Both the outer vessel and the hollow, floating body are made in concrete, iron or another heavy material, as this partly ensures a high mechanical resistance. It also means that the hollow body has very high inertia once it starts to turn in the wind.

In accordance with the invention, the outer vessel has an axial appendix in the form of an axle, which is inserted inside the inner hollow of an axial appendix formed at the base of the floating hollow body.

The outer vessel has two side openings, the upper one for filling and the lower one for emptying, both with their corresponding closing devices, which enable the water to be added in order to keep the hollow body afloat or to empty it.

As the water contained in the outer vessel will gradually evaporate, it is planned for the vessel to have a level indicator visible from outside and optionally equipped with a graduated scale or indication markings of the level of water required to ensure the correct performance of the generator.

The hollow body has an upper peripheral lip which covers the upper end and a side portion of the wall of the outer vessel.

The blades joined to the hollow body are evenly distributed around the periphery, ensuring a uniform turning movement.

These blades are shaped in such a way to take maximum advantage of the wind. They can be of a semi-spherical shape, similar to the blades of an anemometer, an angle section, a triangular prism section, or any other shape which permits maximum wind thrust, when the wind blows on the front surface of the blade, and minimum thrust when it blows on the rear surface, as this position is inevitable when the blades turn together with the hollow body.

Supports are anchored on the wall of the outer vessel, which are equipped with rails directed radially with respect to the vessel. Electric generators are mounted on these rails which can be moved linearly.

The generator axles are placed vertically and are equipped with wheels, preferably in rubber, perpendicular to these axles, meaning in the same horizontal plane.

In accordance with the invention, the generators can be maintained in a set position, with the contact wheels in permanent contact with the floating body. These generators can optionally be connected to drive elements which brings them towards or away from the vessel at a set frequency, in which case the wheels would make contact with tie floating body intermittently, enabling the floating body to acquire a significant turning inertia while the contact wheels are separated.

The drive elements of the electric generator holder carriages can be of any type normally used in the industry to produce linear movement; such as motorised pinion—cogwheel, pneumatic or hydraulic cylinder, ball spindle, etc., controlled by means of a timer.

DESCRIPTION OF THE FIGURES

To complement this description and in order to better understand the features of this invention, this descriptive report is accompanied by a set of drawings indicating the following, for illustrative purposes and with no limitation.

PREFERENTIAL MANUFACTURE OF THE INVENTION

Figure 1:
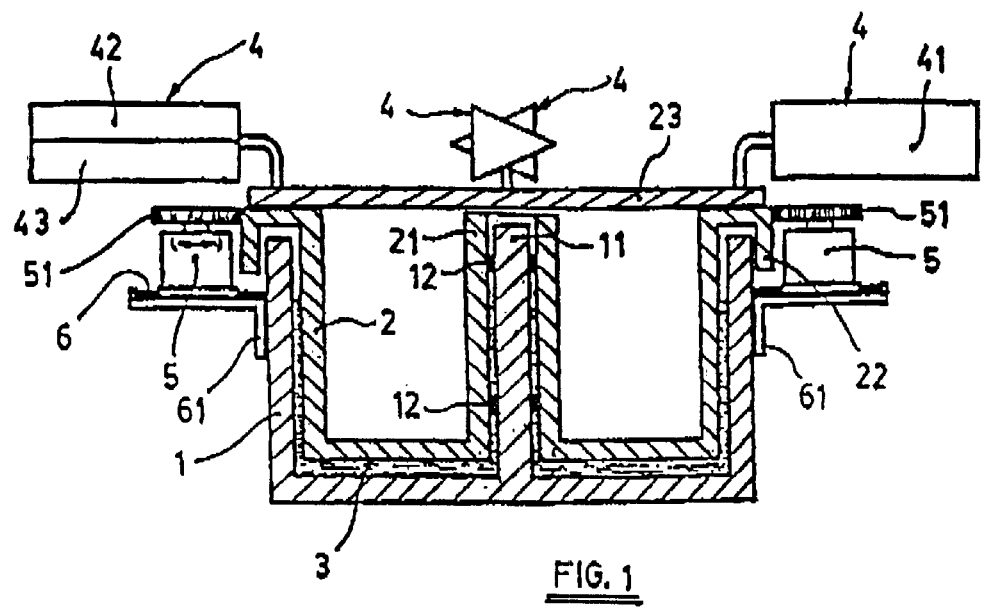
FIG. 1 shows an elevation diagram of the aeolian generator which is the purpose of this invention, cross-sectioned in a vertical plane and with the electric generators in the operating position.
Figure 2:
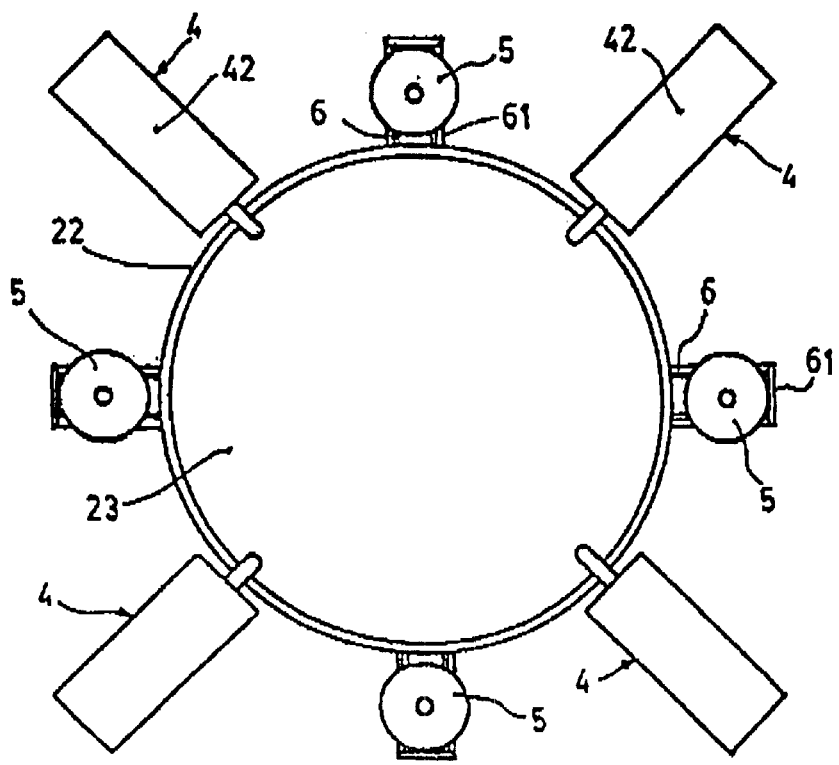
FIG. 2 shows a plan view of the same aeolian generator with the electric generators in the off position, meaning not in contact with the floating body.
Figure 3:
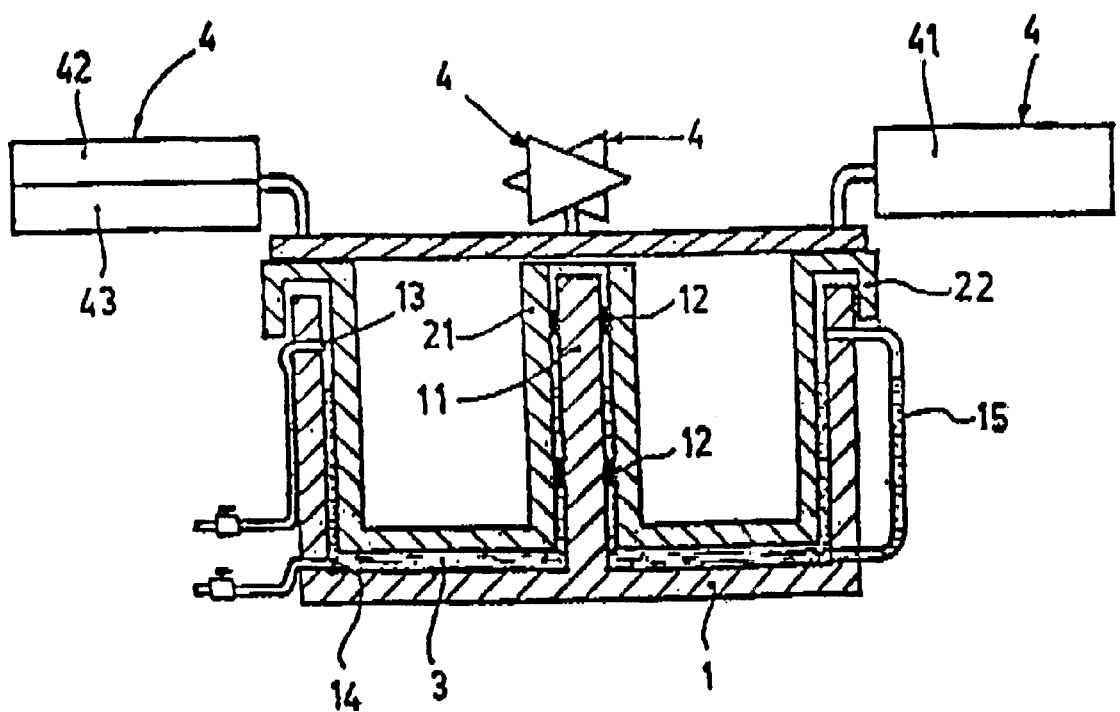
FIG. 3 shows a vertical cross-section of the aeolian generator, in which the lower vessel is turned 45° with respect to FIG. 1, in order to observe the filing and emptying pipes and the water level indicator.

As can be observed in the above figures, this aeolian generator has a cylindrical vessel (1) which houses a hollow body (2) and a sufficient amount of water (3) to ensure that the hollow body (2) floats.

The vessel (1) forms an axial appendix (11) at its base, which is housed inside the tubular shaped axial appendix (21), inside the hollow body (2).

There are bearings (12) between the appendixes (11) and (21), to reduce the friction between the vessel (1) and the body (2) when the body turns in wind.

The hollow body (2) has an upper lip (22) which loosely covers the upper end and part of the side of the vessel wall (1). The upper end of this hollow body (2) s closed by a cover (23) to which a series of blades (4) are attached, which on receiving wind thrust, cause the hollow body (2) to turn.

The hollow body (2) is made in concrete, iron or any other heavy material, and can easily turn when the wind blows on the blades (4) as it floats on water (3).

In order to maintain a water level (3) inside the vessel (1) to ensure that the hollow body (2) remains afloat, it has a filling inlet (13) and an emptying outlet (14), which are connected to hoses or pipes with their corresponding taps. The water level (3) inside the vessel (1) is controlled by a level indicator (15).

In order to take maximum advantage of the wind action on the blades (4), these should be of a suitable shape to receive maximum thrust when in a certain turning position, and minimum thrust when they are in a diametrically opposite position. In this example, the blades have a triangular prism shape, with a vertical side (41) which receives maximum thrust as it is opposite the wind and two sides (42 and 43) which act has deflectors, thereby reducing the wind action on them. As the blades are evenly distributed, whatever the direction of the wind may be, it will simultaneously blow on the side (4) of one of the blades and on the sides (42 and 43) of the blade, which is in a diametrically opposite position, with the difference in these thrusts providing a positive component in the turning direction of the body (2).

This aeolian generator includes electric generators (5) placed around the vessel (2) and mounted in such a way that they can slide on horizontal rails (6) fixed to their respective supports (61). These rails (6) are directed in a radial direction, so that the generators can move towards or away from the lip (22), keeping the wheels (51) in continuous or intermittent contact with the lip (22).

If this contact is intermittent, the generators (5) will move automatically by means of a suitable thrust device (such as a motorised pinion—cogwheel, pneumatic or hydraulic cylinder, etc.) which will be controlled by a timer.

The high mass of the body (2) which could be around one hundred tons, gives it a high level of turning inertia and therefore, when it is turned by the wind, the drive of the generators does not brake this movement significantly.

What is claimed is:

1. An aeolian generator, comprising a cylindrical vessel (1), a hollow body (2) housed in a vessel (1) and which can turn, as a sufficient amount of liquid is contained inside the vessel (1) to keep the hollow body (2) afloat, a cover (23) for the hollow body (2), a series of blades (4) joined to the cover of the hollow body (2), several electric generators (5), wheels (51) mounted on the axles of the electric generators and used to make contact with the body (2) while it turns, supports (61) equipped with rails (6) on which the generators (5) are mounted and can move, and a thrust device used to control the movement of the generators (5) on the rails (6), causing them to move towards the hollow body (2) when it is turning at a certain speed.

2. An aeolian generator according to claim 1 wherein the cylindrical vessel (1) has an axial appendix (11) at the base.

3. An aeolian generator according to claim 2 wherein the hollow body (2) has an tubular-shaped axial appendix (21) at its base, inside of which the axial appendix (11) of the vessel (1) is housed.

4. An aeolian generator according to claim 2 wherein bearings (12) are provided between the facing surfaces of the appendixes (11 and 21).

5. An aeolian generator according to claim 2 wherein bearings (12) are mounted between the axial appendixes (11) and (21), in order to reduce friction of the body (2) on turning inside the vessel (1).

6. An aeolian generator according to claim 1 wherein vessel (1) has a filling inlet (13) and an emptying outlet (14) to introduce water (3) inside and to empty it.

7. An aeolian generator according to claim 1 wherein vessel (1) has a level indicator (15) which displays the level of water contained in said vessel.

8. An aeolian generator according to claim 1 wherein hollow body (2) has a lip (22) on its upper end which loosely covers the upper end and part of the side of the vessel (1).

9. An aeolian generator according to claim 1 wherein blades (4) are evenly distributed on the periphery of cover (23) for the purpose of causing the body (2) to turn on receiving wind thrust.

10. An aeolian generator according to claim 1 wherein hollow body (2) is made of a heavy material capable of providing high inertia on turning on the blades (4) when the wind blows.

11. An aeolian generator according to claim 1 wherein hollow body (2) is a made of in concrete or iron.

12. An aeolian generator according to claim 1 wherein blades (4) are of a triangular prism shape, semi-spherical, or an angle shape to take maximum advantage of the wind thrust.

13. An aeolian generator according to claim 1 wherein electric generator axles (5) are placed vertically.

14. An aeolian generator according to claim 8 wherein wheels (51) joined to the generator axles (5) are placed in a plane perpendicular to these axles and facing the lip (22) of the hollow body (2).

15. An aeolian generator according to claim 1 wherein supports (61) are fixed on the periphery of the vessel (1).

16. An aeolian generator according to claim 8 wherein rails (6) are joined to supports (61) and are placed in radial direction with respect to the vessel (1) in order to bring the generators (5) towards the body (2) and the tangential contact of the wheels (51) with the lip (22) either continuously or intermittently.

* * * * *